United States Patent Office 3,540,900
Patented Nov. 17, 1970

3,540,900
CERAMIC REFRACTORY
Donald L. Guile, Horseheads, N.Y., assignor, by mesne assignments, to Corhart Refractories Company, a corporation of Delaware
No Drawing. Filed Nov. 2, 1967, Ser. No. 680,042
Int. Cl. C04b *35/42*
U.S. Cl. 106—59                                                8 Claims

ABSTRACT OF THE DISCLOSURE

High hot strength, sintered, magnesia-chrome ore refractory bodies derived from raw batch materials containing titania as magnesium orthotitanate spinel rather than as free titania. Products having a hot modulus of rupture of the order of 4000 p.s.i. or more are obtained.

DESCRIPTION OF PRIOR ART

United States Patent 3,194,672, Davies et al., teaches the inclusion of a small amount of titania in brickmaking size graded batches of magnesia and chrome ore, pressing the batch material into desired shapes and firing the thus formed green bodies to obtain basic refractory shapes of enhanced hot strength. The batch contains less than about 5% by weight of $SiO_2$ and the titania is employed in an amount by weight of from 0.5 to about 5 part per 100 parts of batch. The first bodies have a hot modulus of rupture at 2300° F. (1260° C.) of about 1000 p.s.i.

McTaggart et al., in United States Patent 3,282,713, provide sintered refractory magnesia-chrome ore bodies containing from 3 to less than 15% of titania. These bodies display a modulus of rupture at 1340° C., a higher temperature of measurement than that employed by Davies et al., of from 1200 to slightly more than 2000 p.s.i. Additionally, they are resistant to the action of molten basic ferruginous slag and display improved thermal shock resistance.

Neither of the above patents provide or suggest the sintered titania-containing magnesia-chrome ore sintered refractory bodies of the present invention which display unusually high hot strength, their modulus of rupture at 1340° C. being of the order of 4000 to 5000 p.s.i. or more.

SUMMARY OF THE INVENTION

This invention relates to a shaped, sintered ceramic refractory body or product exhibiting greatly increased hot strength. Additionally, this invention relates to such a refractory body, basic in nature, that also possesses good resistance to corrosion and/or erosion by molten materials present in metallurgical processes, such as ferrous metals and basic slags of the type encountered in basic open hearth and basic oxygen vessel steelmaking processes. The invention further relates to the raw material batches from which the sintered refractory bodies are produced.

In recent years, steelmaking processes have been continually improved in efficiency by employing more rapid processing cycles and higher process temperatures, particularly due to oxygen lancing techniques. Obviously, the employment of these higher process temperatures makes it highly desirable to provide, as furnace linings, refractory bodies having much greater hot strength than those previously known to the art.

This is particularly important in two areas of the LD basic oxygen steelmaking furnace lining, the area adjacent the trunnions and the so-called charge pad area. It is apparent that the trunnions supporting the furnace and the outer metal furnace wall in an area around the trunnions are subject to extreme mechanical stress. Some warping of the outer metal wall in this area is unavoidable and the stress is transmitted to the contiguous furnace lining. A lining of low hot strength may suffer loss of integrity under the deforming forces applied at the temperatures prevailing during the steelmaking process.

The charge pad area is that area of the furnace lining onto which, when the furnace is tilted to receive a charge of raw material, the charge is delivered. This area is subjected, while at elevated temperature, to the impact of the charge being delivered and to the abrasive action of the charge moving over its surface during charging and during the return of the furnace to the upright position. The necessity of the lining in this area exhibiting high hot strength is apparent.

High hot strength is also extremely important in the refractory lining of the Kaldo furnace. Here, as in the LD furnace, a portion of the lining is subjected to the impact of the raw materials being charged. Furthermore, because of the rotation of the furnace, the lining is additionally subjected to extreme abrasive action from the unmelted portion of the charge.

It is therefore an object of this invention to provide a novel, shaped, sintered ceramic product or article of manufacture which, in addition to exhibiting good resistance to deterioration by molten ferrous metals and molten ferruginous slags, has very high strength at elevated temperatures.

The refractory products of United States Patent 3,282,-713, briefly referred to above, possess excellent resistance to the action of basic oxygen steelmaking slags and are thermally shock resistant. In addition, they display, relative to prior art products, good high temperature strength. Nevertheless, because of the conditions of their use in LD and Kaldo type furnaces, products of significantly enhanced hot strength obviously are greatly to be desired.

A shaped, sintered ceramic refractory body according to United States Patent 3,282,713 is composed of a mixture of materials yielding, in the sintered product, an essential analytical combination of titanium oxide with magnesium oxide and chromium oxide such that the product analytically consists essentially of, by weight, 3 to less than 15% (preferably 5 to 10%) $TiO_2$, 0.8 to 25% $Cr_2O_3$, 40 to less than 95% (preferably 45 to 92% MgO, the sum of $TiO_2+Cr_2O_3+MgO$ being at least 75% (preferably at least 80%), up to 15% $Fe_2O_3$, less than 7.5% $Al_2O_3$, less than 2% $SiO_2$ has less than 1% CaO.

The above referred to ceramic refractory product is characterized by the essential homogeneity of its macroscopic mineralogy. By mineralogy is meant the combination of chemical composition, phases or crystals and their amount, size, distribution and bonding, and porosity and its amount, size and distribution. On a macroscopic sale all the aforementioned structural features are substantially uniformly alike, i.e. homogeneous, throughout the product. It is this fact that accounts for the resistance to corrosion by slag and molten ferrous metal of the described product.

The homogeneity of structure is due to the fact that the raw batch materials from which the product is formed are intimately blended and finely divided; substantially all (i.e., at least 99% by weight) particles will pass through a 149 micron opening (i.e. 100 mesh U.S. standard fine series). Although the smallest particle size may range down to less than 0.1 micron any substantial amount of extreme fines is to be avoided because otherwise, as is well known, they would cause excessive firing shrinkage as a result of the necessity of using excessive amounts of molding mediums to provide moldability of the raw batch materials. As a general rule, particles less than 1 micron should amount to less than 5% by weight.

Despite the general excellence of the above described refractory products, it is apparent that their practical value would be greatly enhanced if their hot strength were to be significantly increased, thereby increasing their utility as linings for LD and Kaldo steelmaking furnaces. The present invention accomplishes that end.

It has been found that, in the preparation of the raw materials batch of the above described type, if the titanium oxide is employed in the form of the spinel, magnesium orthotitanate, the sintered refractory product made from the batch possesses a hot modulus of rupture 2 to 3 times greater than a product made from a batch having the same analytical composition but containing the titanium oxide in an uncombined form admixed with the chrome ore and magnesia. In other words, the titanium oxide is prereacted with a stoichiometric quantity of magnesia taken from the total amount of magnesia in the batch. This prereacted spinel is finely comminuted and intimately blended with the finely comminuted balance of the magnesia and the finely comminuted chrome ore.

The pre-reacted magnesium orthotitanate may be obtained by fusion of a mixture of stoichiometric quantities of titania and magnesia. Preferably, however, an intimate mixture of finely divided titania and magnesia in stoichiometric ratio is sintered at a temperature of from about 1400° C. to about 1600° C. for from 2 to 18 hours. This latter solid state reaction is essentially complete and is, of course, more economical in regard to fuel cost than is the fusion process.

It will be understood that the spinel-forming materials may be essentially pure titania and magnesia. However, it is possible and economically advantageous to employ common good grades of titania and magnesia in amounts such that the stoichiometric ratio of $TiO_2$ and $MgO$ is attained. The choice of raw material will be within the skill of the worker in the art who will recognize that the materials chosen should not introduce into the final batch amounts of $Fe_2O_3$, $Al_2O_3$, $SiO_2$ and $CaO$ in excess of the amounts hereinbefore set out as limiting values for these impurities in U.S. 3,282,713, which limits apply to the raw material batches of the present invention, as do the general compositional limits thereof. Of course, the analytical composition of the chrome ore to be employed must also be taken into account in choosing the titania and magnesia sources.

Preferably, all of the titania of a given batch will be employed in the form of pre-reacted magnesium titanate spinel. However, it is possible to employ a minor portion of the titania as such, the balance being in the form of the spinel.

The superiority of the products of the present invention in regard to hot strength over products of the same analytical composition but made from raw material batches in which the titania is in an uncombined form is completely unexpected for various reasons. In the manufacture of refractory bodies of the latter type, magnesium orthotitanate spinel is formed and the spinel content of the fired body would be expected to be the same as that of a fired body embodying the pre-reacted spinel. The raw material batches may be identical as to degree of comminution and intimacy of blending. Forming operations and the firing of the green bodies are the same in each case. Finally, and most importantly, the microscopic mineralogy of products of the present invention is quite similar to that of the products made from batches containing unreacted titania, differing principally in grain size. Photomicrographic comparison of the products shows that the average grain size of the products of the present invention is approximately 3 to 5 times larger than that of the product derived from a raw material batch in which all the titania is present as such. As is generally understood, for sintered ceramic bodies of essentially the same composition, those possessing the finer grain size would generally be expected to exhibit a higher modulus of rupture than the coarser grained material.

The products of the present invention exhibit homogeneous microscopic mineralogy, as hereinbefore defined. This is in consequence of the critical and necessary very small or fine particle sizing of the raw batch materials, as was discussed above in reference to U.S. Patent 3,282,713. This fine particle sizing, as well as the use of the pre-reacted magnesium titanate spinel as a raw batch component, also accounts for the microscopic mineralogy of the products of the invention.

A body or product according to this invention microscopically comprises essentially an intimate, intergrown mixture of fine periclase crystals and fine mixed magnesium-spinel crystals with substantial direct mineralogical bonding of these crystals to those adjacent thereto, and at least a major portion of the periclase crystals containing therein very fine exsolved (or precipitated) mixed magnesium-spinel crystals and discontinuous microcracks. Because of the intimacy of contact between the finely comminuted particles in the molded green body, there results, in the final fired and sintered product, superior direct and integrown bond development between adjacent periclase and mixed magnesia spinel crystals. The greatly enhanced reactivity of finely divided and intimately mixed batch material results in substantial diffusion process activity during firing. Thus, for example, a substantial, or even major portion of most of the grain boundaries between original magnesite particles is obliterated by such diffusion yielding intergrown periclase crystals whereby at least a majority of the somewhat distinct periclase crystals are all linked as a substantially continuous phase, due to the discontinuous grain boundaries therebetween. Furthermore, a substantial amount of spinel-forming oxides diffuse into the periclase crystals as solid solution therein during firing, and upon cooling, very fine precipitates of the mixed magnesia spinel form or exsolve within at least a majority of these periclase crystals as well as at portions of their grain boundaries, the amount of exsolved spinel increasing as the ratio, chrome ore to titania, increases. The latter grain boundary precipitates, as well as the primary magnesium-spinel crystals, have a substantial or greater portion of their faces or surfaces abutting, in contiguous or direct bond, with the faces or surfaces of adjacent periclase or spinel crystals. Because of the low, restricted impurity content of oxides that form low-melting components or phases, there is very little of the latter, e.g. silicates or aluminates, mostly in small, scattered or isolated islands which do not prevent or hinder the excellent direct bonding between the more refractory crystal phases, as might otherwise be the case if larger amounts of such impurities were incorporated with the resulting formation of low-melting films between the more refractory crystals.

It appears that due to the considerable amount of exsolved spinel crystals included within individual periclase crystals and to a substantial number of instances where primary or grain boundary spinel crystals protrude into or are strongly bonded to periclase crystals, a significant amount of discontinuous microcracking occurs within and between many of the periclase crystals. This apparently is the result of the magnesium-spinel crystals having a smaller coefficient of thermal expansion than that of the periclase crystals and the latter being relatively weak in tension. Hence, the spinel crystals wholly or partially within the periclase crystals shrink more slowly on cooling than the latter and cause considerable tension stresses in these periclase crystals, many times resulting in the microcracks when the stresses get too high. These microcracks are essentially all discontinuous as the result of being physically interrupted, such as by pores, boundaries of exsolved, included spinel crystals, etc. The development of these discontinuous microcracks is believed to significantly and importantly contribute to the good thermal shock resistance found in the high hot strength bodies of the present invention.

The mixed, complex magnesium-spinel crystals in bodies according to this invention appear to be solid solution of picrochromite ($MgO \cdot Cr_2O_3$) and magnesium orthotitanate. Of course, any iron oxide as $Fe_2O_3$ and any $Al_2O_3$ that are permissible in the batch materials will substitute for or replace some $Cr_2O_3$ and/or $TiO_2$ in the spinel lattice, which may be characterized as magnesioferrite ($MgO \cdot Fe_2O_3$) and/or "spinel" ($MgO \cdot Al_2O_3$) being in solid solution in the principal spinel crystals described above. Moreover, any iron oxide as FeO that is permissible in the batch materials will substitute for or replace some MgO in the lattice of either or both of the periclase and spinel crystals. It will, of course, be understood, that these various "spinels" do not appear as separate entities; only a single recognizable complex spinel is evident.

The pre-reacted magnesium orthotitanate spinel for use as a batch ingredient is most conveniently prepared by firing an intimate mixture of approximately 2 mols of magnesia per mol of titania for several hours at a temperature of at least about 1400° C., preferably 1500° C. To achieve essentially complete spinel formation in a practical period of time, the magnesia and titania should be finely divided; substantially all of these finely divided raw materials should pass through a 200 mesh screen.

For convenience and ease of handling, the pulverulent mixture is formed into blocks by slip casting, dry pressing or other appropriate method known to the art and the thus formed blocks are fired. The sintered spinel blocks resulting are then first crushed to a desired size; this crushed material is thereafter comminuted as are the other raw batch materials, to meet the particle sizing requirements of U.S. Patent 3,282,713, hereinbefore discussed.

In the preparation of the magnesium titanate spinel, the raw materials are employed in such amounts as to insure an essentially stoichiometric ratio of magnesia and titania, that is, in the proportion of 49.75% by weight of titania to 50.25% by weight of magnesia. As will be understood, to achieve this stoichiometric balance, due regard must be given to the actual MgO and $TiO_2$ content of their respective raw materials sources.

Comminution of raw materials to the desired fine particle sizes can be conveniently carried out in conventional fluid energy pulverizers wherein partially ground raw material is entrained in a high velocity gas (e.g., air or steam) stream that is directed toward a similar material-bearing, high velocity gas stream, or is directed against a solid surface. In both cases, the raw material particles are crushed to the required fine sizes as a result of the high velocity impacting on another solid substance. Each raw material is usually finely comminuted separately; however, the fine comminution can be carried out after suitably proportioned batch mixtures are formed when desired.

Molding of the batch mixture into products or articles of desired shape can be done by any appropriate technique, many of which are well known to those skilled in this art, e.g. slip casting, pressing, extruding, etc. After molding, the shaped mixture is hardened and/or dried as is appropriate for the particular molding technique. Finally, the green shaped pieces are fired at a temperature of at least about 1600° C. (preferably in the range of 1600°–1800° C.) for a time sufficient to develop strongly coherent sintering and bonding of the crystals as described above, and then subsequently cooled to handling or room temperature according to conventional or desired practice.

DESCRIPTION OF THE PREFERRED EMBODIMENTS

In the following non-limiting examples, all parts and percentages are on a weight basis. Furthermore, in conformity with conventional practice in the refractory ceramic art, all chemical analyses of the ceramic batch materials are given on an oxide basis.

Example 1

Magnesium orthotitanate spinel was prepared from fritmakers grade titania (99% min. $TiO_2$, 0.01% max. $Fe_2O_3$, 0.20% $SO_3$) and calcined magnesite (98.45% MgO, 0.66% CaO, 0.16% $SiO_2$, 0.14% $Fe_2O_3$, 0.12% ignition loss). To obtain the ratio $2MgO \cdot TiO_2$, equal parts of the calcined magnesite and the titania were employed. The particle size of the materials was such that all of the calcined magnesite passed through a 200 mesh Tyler sieve and 95% of the titania passed through a 325 Tyler sieve. An intimate dry blend of the two was prepared. A slip was then prepared by mixing 100 parts of the blended material with 16 parts of a 7% solution of fish oil in toluene. This slip was mixed in a rotating container for 20 hours, after which it was cast into molds to form blocks of approximately 6 x 6 x 6 in. on solidification therein. These green blocks were dried at 65° C. and then fired at 1500° C. for 16 hours. The resulting fired blocks were crushed and then comminuted to the degree that all of the material passed through a 100 mesh Tyler sieve.

Dry batch mixtures for refractory ceramics were prepared from the magneisum orthotitanate so obtained, the previously described calcined magnesite and Transvaal low silica chrome ore (46.5% $Cr_2O_3$, 26.2% $FeO+Fe_2O_3$, 13.4% $Al_2O_3$, 11.0% MgO, 0.9% $SiO_2$). The latter materials were comminuted to the degree that substantially all of each passed through a 100 mesh Tyler screen.

Slips were prepared from each of these dry mixtures by adding 100 parts thereof to 11 parts of a 7% solution of fish oil in toluene. These slips were mixed in rotating containers for about 20 hours and were cast in molds to give green blocks measuring approximately 2 x 4 x 6 in. These were dried at 65° C. and then fired at 1750° C. for 16 hours.

Example 2

Raw materials batches comparable in composition and in degree of comminution to those above described were prepared. They differed, however, in that the titania and magnesite were not pre-reacted to form magnesium orthotitanate spinel. In other words, these batches were intimate blends of titania, magnesite and chrome ore. Sintered bodies were prepared therefrom.

In the table below the compositions of the both sets of batch mixtures are given, together wtih the calculated analytical compositions of the fired products and certain physical properties thereof.

TABLE I

|  | 1 | 2 | 3 | 4 | 5 | 6 | 7 | 8 | 9 |
|---|---|---|---|---|---|---|---|---|---|
| Batch mixture (wt. percent): | | | | | | | | | |
| Magnesite | 80 | 78 | 76 | 70 | 70 | 66 | 69 | 60 | 65 |
| Chrome ore | 10 | 10 | 16 | 20 | 10 | 10 | 15 | 20 | 15 |
| Titania | 10 | 12 | 8 | 10 | | | | | |
| $2MgO \cdot TiO_2$ | | | | | 20 | 24 | 16 | 20 | 20 |
| Analytical composition (calculated wt. percent): | | | | | | | | | |
| $TiO_2$ | 10 | 12 | 8 | 10 | 10 | 12 | 8 | 10 | 10 |
| $Cr_2O_3$ | 4.65 | 4.65 | 7.45 | 9.3 | 4.65 | 4.65 | 6.98 | 9.3 | 6.98 |
| MgO | 79.9 | 77.8 | 76.5 | 71.1 | 77.9 | 77.8 | 77.5 | 71.1 | 75.5 |
| $Fe_2O_3$ | 2.73 | 2.73 | 4.31 | 5.29 | 2.73 | 2.73 | 4.04 | 5.29 | 4.04 |
| $Al_2O_3$ | 1.34 | 1.34 | 2.14 | 2.68 | 1.34 | 1.34 | 2.01 | 2.68 | 2.01 |
| $SiO_2$ | 0.22 | 0.21 | 0.26 | 0.29 | 0.22 | 0.21 | 0.26 | 0.29 | 0.26 |
| CaO | 0.53 | 0.52 | 0.50 | 0.45 | 0.53 | 0.52 | 0.51 | 0.45 | 0.49 |
| Density (gm./cc.) | 3.30 | 3.23 | 3.40 | 3.40 | 3.16 | 3.18 | 3.31 | 3.33 | 3.19 |
| MOR at 1340° C. (p.s.i.) | 1,728 | 825 | 1,450 | 1,996 | 3,420 | 4,350 | 4,545 | 5,925 | 5,050 |

The beneficial effect of employing $TiO_2$ (and a corresponding amount of MgO) as $2MgO \cdot TiO_2$, rather than as uncombined $TiO_2$, in the raw material batch is immediately evident from an inspection of the data in the above table. For example, composition 7 is virtually the same as composition 3; the fired densities of products of these compositions are essentially the same. However, it will, for example, be noted that the modulus of rupture at 1340° C. of the sintered body of composition 7, that in which the $TiO_2$ in the raw material batch was in the form of magnesium orthotitanate spinel, $2MgO \cdot TiO_2$, is three times greater than that of the sintered body of composition 3 in which the same amount of $TiO_2$, 8%, was employed as uncombined titania. The hot modulus of the product of composition 6 is 4 times that of the product of the directly comparable composition 2.

For optimum balance of properties, that is, good thermal shock resistance coupled with high hot strength, it is preferred to restrict the analytical composition of the products of the invention so as to consist essentially of, by weight, 5 to 12% $TiO_2$, 0.8 to 25% $Cr_2O_3$, 45 to 92% MgO, the sum of $TiO_2+Cr_2O_3+MgO$ being at least 80%, up to 15% $Fe_2O_3$, less than 7.5% $Al_2O_3$, less than 2% $SiO_2$ and less than 1% CaO.

I claim:

1. A shaped, sintered refractory body characterized by a modulus of rupture at 1340° C. of at least about 3400 p.s.i. and made from a raw material batch:
   (a) analytically consisting essentially of, by weight, 3 to less than 15% $TiO_2$, 0.8 to 25% $Cr_2O_3$, 40 to less than 95% MgO, the sum of $TiO_2+Cr_2O_3+MgO$ being at least 75%, up to 15% $Fe_2O_3$, less than 7.5% $Al_2O_3$, less than 2% $SiO_2$ and less than 1% CaO,
   (b) substantially all of the $TiO_2$ and a stoichiometrically corresponding amount of the MgO being present in said batch as $2MgO \cdot TiO_2$, and
   (c) said batch being in the form of an intimate mixture of finely divided particles, substantially all of which pass through a 149 micron sieve opening.

2. The shaped, sintered refractory body of claim 1 wherein less than 5% by weight of said particles are less than 1 micron.

3. The shaped, sintered refractory body of claim 2 in which said body has been fired at a temperature of at least about 1600° C.

4. The shaped, sintered refractory body of claim 3 further characterized by a modulus of rupture at 1340° C. of at least about 4000 p.s.i.

5. The shaped, sintered refractory body of claim 1 wherein said batch analytically consists essentially of, by weight, 5 to 12% $TiO_2$, 0.8 to 25% $Cr_2O_3$, 45 to 92% MgO, the sum of $TiO_2+Cr_2O_3+MgO$ being at least 80%, up to 15% $Fe_2O_3$, less than 7.5% $Al_2O_3$, less than 2% $SiO_2$ and less than 1% CaO.

6. The shaped, sintered refractory body of claim 5 wherein less than 5% by weight of said particles are less than 1 micron.

7. The shaped, sintered refractory body of claim 6 in which said body has been fired at a temperature of at least about 1600° C.

8. The shaped, sintered refractory body of claim 7 further characterized by a modulus of rupture at 1340° C. of at least about 4000 p.s.i.

References Cited

UNITED STATES PATENTS

| | | | |
|---|---|---|---|
| 3,194,672 | 7/1965 | Davies et al. | 106—59 |
| 3,282,713 | 11/1966 | McTaggart et al. | 106—59 |
| 3,316,107 | 4/1967 | Havranek | 106—59 |

JAMES E. PIER, Primary Examiner